US012548949B2

(12) United States Patent
Liao et al.

(10) Patent No.: US 12,548,949 B2
(45) Date of Patent: Feb. 10, 2026

(54) ELECTRICAL CONNECTOR HAVING THREE ROWS OF CONTACTS AND A COUPLING ELEMENT INTERCONNECTING SELECTED GROUND CONTACTS THEREOF

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Fang-Jwu Liao, New Taipei (TW); Jia-Hau Liu, New Taipei (TW); Jui-Hsianh Chiu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 303 days.

(21) Appl. No.: 18/208,373

(22) Filed: Jun. 12, 2023

(65) Prior Publication Data

US 2023/0411907 A1 Dec. 21, 2023

(30) Foreign Application Priority Data

Jun. 18, 2022 (CN) ......................... 202210693583.5

(51) Int. Cl.
*H01R 13/6471* (2011.01)

(52) U.S. Cl.
CPC ................................ *H01R 13/6471* (2013.01)

(58) Field of Classification Search
CPC ............ H01R 13/2435; H01R 13/6588; H01R 13/6581; H01R 13/6597; H01R 13/6471
USPC ............................................ 439/66, 74, 658
See application file for complete search history.

(56) References Cited

U.S. PATENT DOCUMENTS 6,435,913 B1 8/2002 Billman
7,114,959 B2 * 10/2006 Stone ................. H01R 13/6466 439/70
7,131,850 B2 * 11/2006 Frutschy ............. H05K 7/1061 439/71
7,604,502 B2 10/2009 Pan
(Continued)

FOREIGN PATENT DOCUMENTS

CN 201994452 U * 9/2011
CN 202034628 U * 11/2011
CN 111244701 A * 6/2020 ......... H01R 13/6588

*Primary Examiner* — Marcus E Harcum
(74) *Attorney, Agent, or Firm* — Ming Chieh Chang

(57) ABSTRACT

An electrical connector includes: a substrate having plural holes; plural contacts mounted in the corresponding holes, the plural contacts including a first row of contacts arranged as a pair of signal contacts flanked by two ground contacts, a second row of contacts having four ground contacts on one side of the first row of contacts, and a third row of contacts having four ground contacts on another side, each contact including a body and an upper arm; and a coupling element interconnecting the two ground contacts of the first row to selected ground contacts of the second and third rows, wherein the upper arm of each of the plurality of contacts has a contacting convex facing upward, and the four ground contacts of the second row are connected side by side and the four ground contacts of the third row are connected side by side.

2 Claims, 12 Drawing Sheets

(56) References Cited

U.S. PATENT DOCUMENTS

| | | | | |
|---|---|---|---|---|
| 7,785,148 | B2 | 8/2010 | Pan | |
| 8,425,263 | B2 * | 4/2013 | Ju | H01R 12/73 439/709 |
| 8,491,337 | B2 * | 7/2013 | Cai | H01R 13/2407 439/66 |
| 8,535,093 | B1 * | 9/2013 | Mason | H01R 13/6585 439/607.05 |
| 8,545,240 | B2 | 10/2013 | Casher et al. | |
| 8,641,449 | B2 * | 2/2014 | Cai | H01R 13/6585 439/607.1 |
| 9,033,737 | B2 * | 5/2015 | Chang | H01R 13/6588 439/607.05 |
| 9,106,022 | B2 * | 8/2015 | Cai | H01R 13/6471 |
| 9,147,980 | B2 * | 9/2015 | Chang | H01R 13/6585 |
| 9,166,343 | B1 | 10/2015 | Jeon et al. | |
| 9,178,322 | B2 * | 11/2015 | Chang | H01R 13/6594 |
| 9,240,657 | B2 * | 1/2016 | Chang | H01R 13/6588 |
| 10,236,635 | B2 * | 3/2019 | Ju | H01R 12/714 |
| 10,490,951 | B2 * | 11/2019 | Chang | H01R 12/716 |
| 10,886,655 | B2 * | 1/2021 | Hwang | H01R 13/41 |
| 11,108,183 | B2 | 8/2021 | Liao | |
| 2013/0052843 | A1 * | 2/2013 | Johnescu | H01R 13/658 439/95 |
| 2015/0056857 | A1 * | 2/2015 | Chang | H01R 13/6588 439/607.09 |
| 2019/0052021 | A1 * | 2/2019 | Hsu | H01R 13/2442 |
| 2021/0075178 | A1 * | 3/2021 | Hwang | H01R 13/506 |
| 2021/0104831 | A1 * | 4/2021 | Cheng | H01R 12/71 |
| 2022/0224054 | A1 * | 7/2022 | Xu | H01R 13/6471 |
| 2023/0208058 | A1 * | 6/2023 | Morgan | H01R 12/716 439/65 |
| 2023/0318217 | A1 * | 10/2023 | Tsai | H05K 7/1069 439/66 |
| 2023/0387634 | A1 * | 11/2023 | Hou | H01R 13/6585 |
| 2023/0411906 | A1 * | 12/2023 | Morgan | H01R 13/2435 |

* cited by examiner

ELECTRICAL CONNECTOR HAVING THREE ROWS OF CONTACTS AND A COUPLING ELEMENT INTERCONNECTING SELECTED GROUND CONTACTS THEREOF

BACKGROUND OF THE INVENTION

1. Field of the Invention

The present invention relates to an electrical connector, comprising: a substrate having a plurality of holes; a plurality of contacts mounted in corresponding holes of the substrate, the plurality of contacts including a first row of contacts arranged as a pair of signal contacts flanked by two ground contacts, a second row of contacts having four ground contacts on one side of the first row of contacts, and a third row of contacts having four ground contacts on another side of the first row of contacts, each contact including a body, an upper arm, and a lower arm; and a coupling element interconnecting the two ground contacts of the first row to selected ground contacts of the second and third rows.

2. Description of Related Arts

U.S. Pat. No. 11,108,183 discloses an electrical connector having plural rows of contacts, wherein for any given two adjacent signal contacts serving as a differential pair with surrounding ground contacts, there may exist resonance frequency problem difficult to solve and introducing cross-talk.

U.S. Pat. No. 9,166,343 discloses an electrical connector having a ground lattice that includes longitudinal receptacle ground shields and lateral receptacle ground shields. The longitudinal receptacle ground shields are mechanically and electrically connected to the lateral receptacle ground shields. The ground lattice provides electrical shielding for contacts arranged in differential signal pairs. The ground lattice forms shield boxes with a pair of longitudinal receptacle ground shields on respective opposites sides of the corresponding shield box and with a pair of lateral receptacle ground shields on respective opposite sides of the corresponding shield box.

SUMMARY OF THE INVENTION

An electrical connector comprises: a substrate having a plurality of holes; a plurality of contacts mounted in corresponding holes of the substrate, the plurality of contacts including a first row of contacts arranged as a pair of signal contacts flanked by two ground contacts, a second row of contacts having four ground contacts on one side of the first row of contacts, and a third row of contacts having four ground contacts on another side of the first row of contacts, each of the plurality of contacts including a body and an upper arm; and a coupling element interconnecting the two ground contacts of the first row to selected ground contacts of the second and third rows, wherein the upper arm of each of the plurality of contacts has a contacting convex facing upward, and the four ground contacts of the second row are connected side by side and the four ground contacts of the third row are connected side by side.

DETAILED DESCRIPTION OF THE PREFERRED EMBODIMENTS

Figure 1:
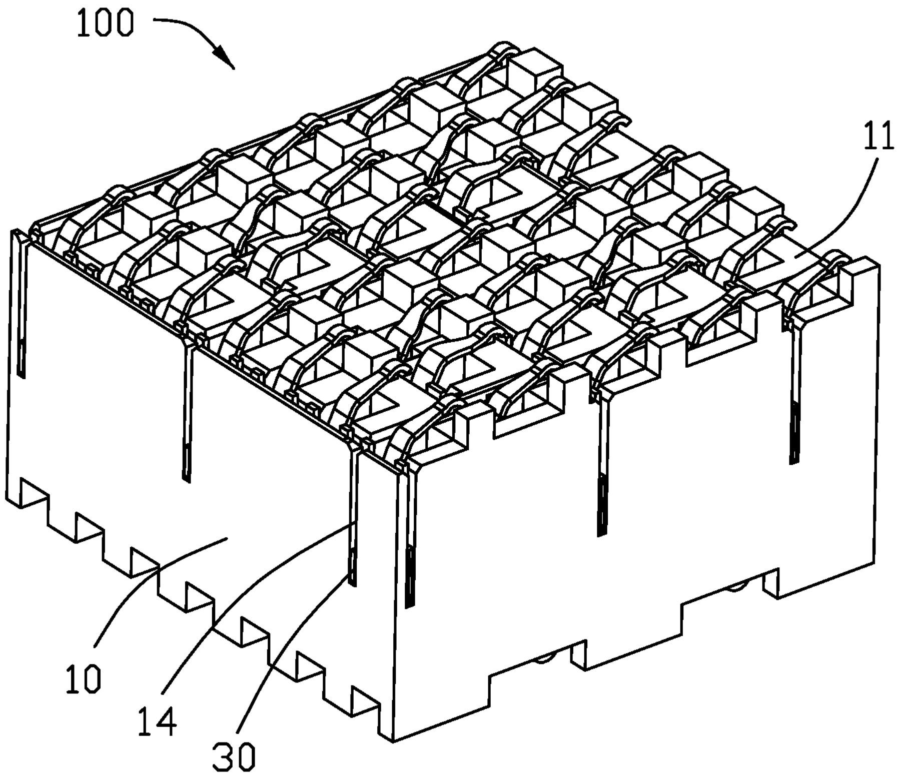
FIG. 1 is a perspective view of an electrical connector in accordance with the present invention.

Referring to FIGS. 1-9, an electrical connector 100 includes: a substrate 10 having a plurality of holes 13 through two opposite surfaces 11 and 12 thereof; a plurality of contacts 20 mounted in corresponding holes 13 of the substrate 10; and a coupling element 30 interconnecting the two ground contacts 22*a* of the first row to selected ground contacts 22*b* and 22*c* of the second and third rows. As an example, the plurality of contacts 20 may include a first row of contacts along direction X arranged as a pair of signal contacts 21 flanked by two ground contacts 22*a*, a second row of contacts along direction X having four ground contacts 22*b* on one side of the first row of contacts along direction Y as group 220*b*, and a third row of contacts along direction X having four ground contacts 22*c* on another side of the first row of contacts along direction Y as group 220*c*.

Figure 4:
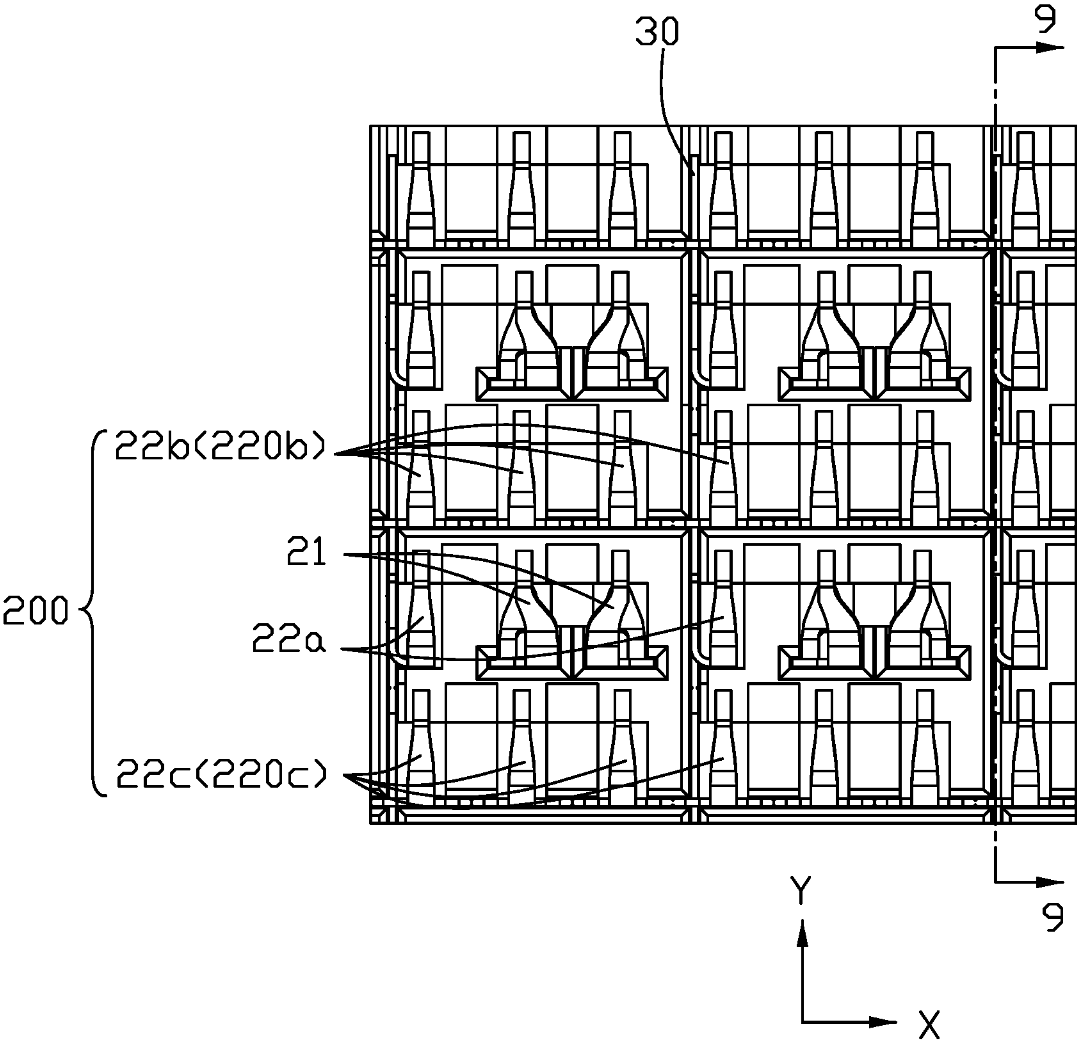
FIG. 4 is a top view of the electrical connector.

In this embodiment, respective four contacts of the first, second, and third rows are aligned along direction Y so that the pair of signal contacts 21 are surrounded by ten (10) ground contacts in the form of a shield box 200. It is noted that the shield box 200 in FIG. 4 shows only part of the electrical connector 100. The electrical connector 100 may include over a thousand contacts constructed in a similar manner as the shield box 200 or by merely expanding or repeating the shield box 200 in a suitable manner. As can be understood, in constructing a connector with one thousand contacts, either the group 220*b*, the group 220*c*, or the ground contacts 22*a* and 22*b* and 22*c* interconnected by the coupling element 30 may be shared by adjacent shield boxes 200.

Figure 5:
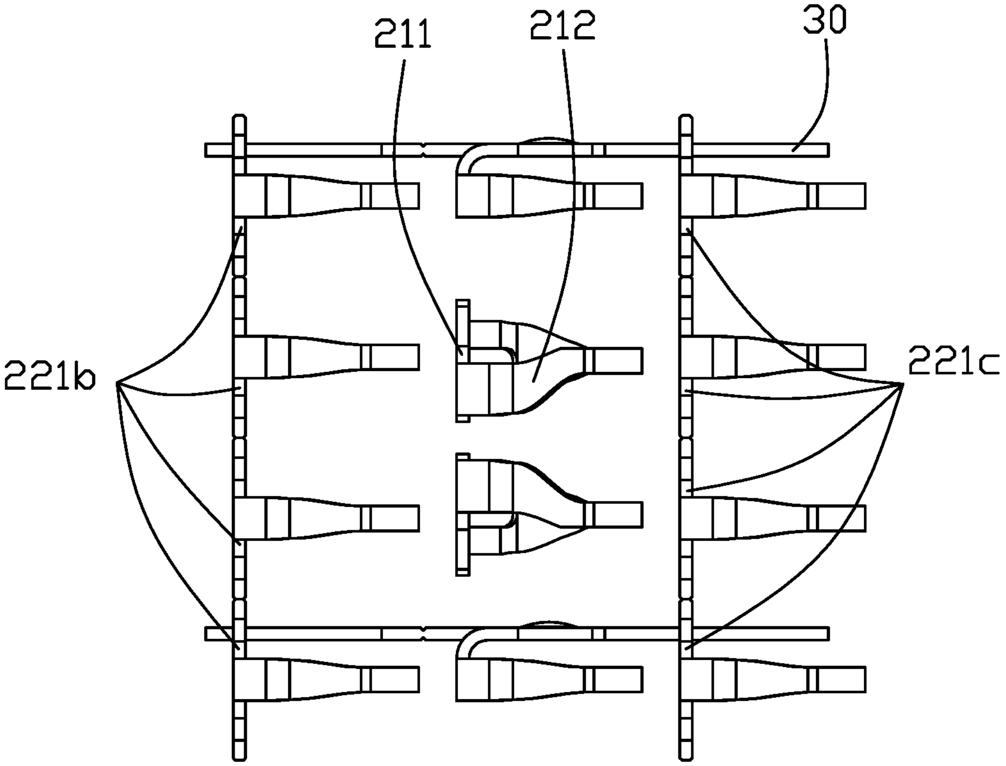
FIG. 5 is a top view showing three rows of contacts of the electrical connector.
Figure 6:
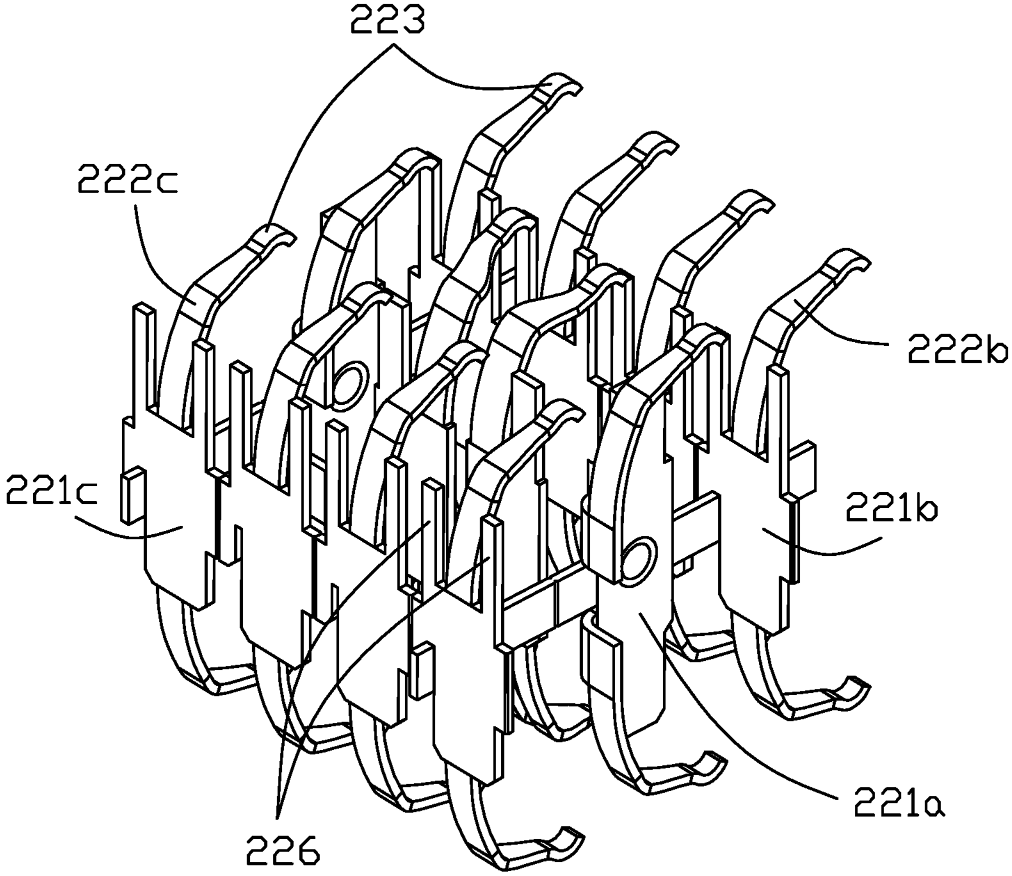
FIG. 6 is a perspective view of the three rows of contacts.
Figure 7:
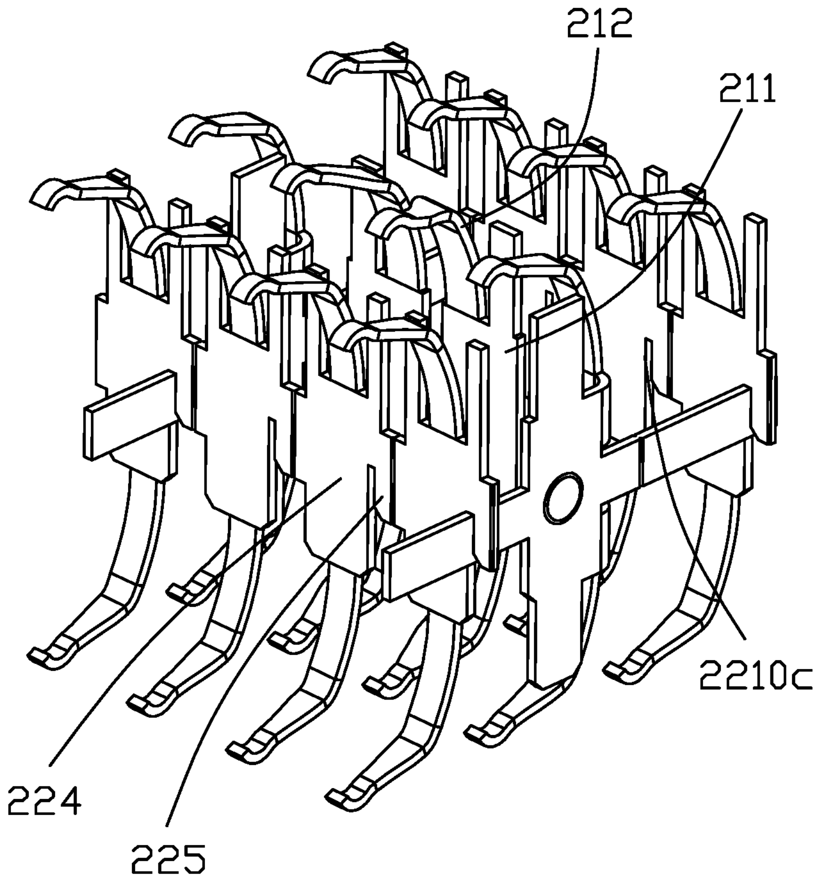
FIG. 7 is a view similar to FIG. 6 but from another perspective.
Figure 8:
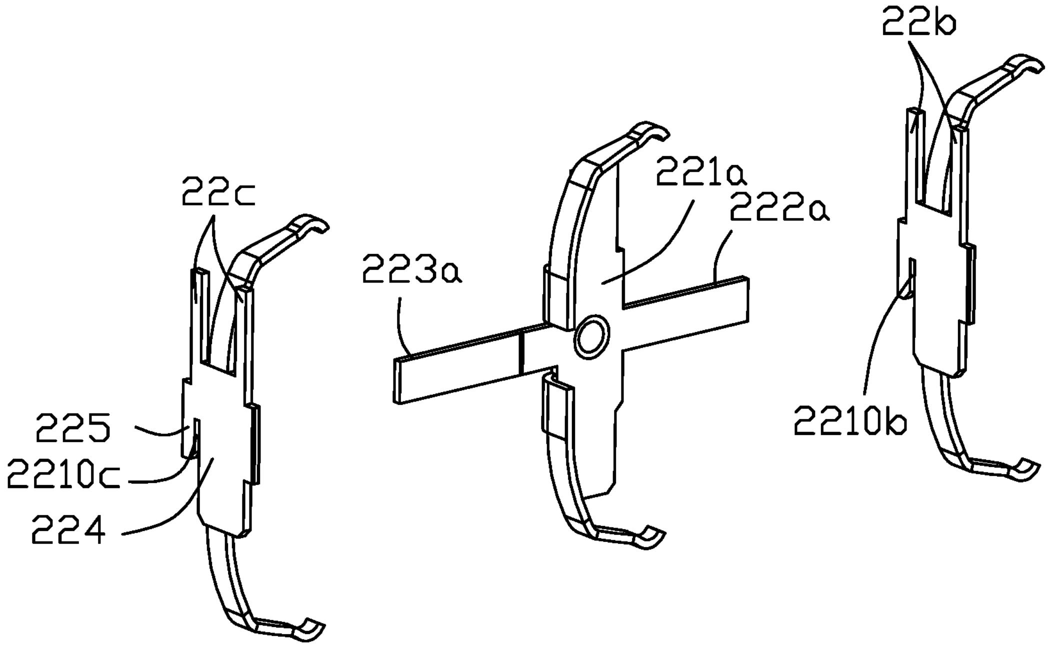
FIG. 8 is an exploded view showing selected ground contacts of the three rows of contacts.
Figure 9:
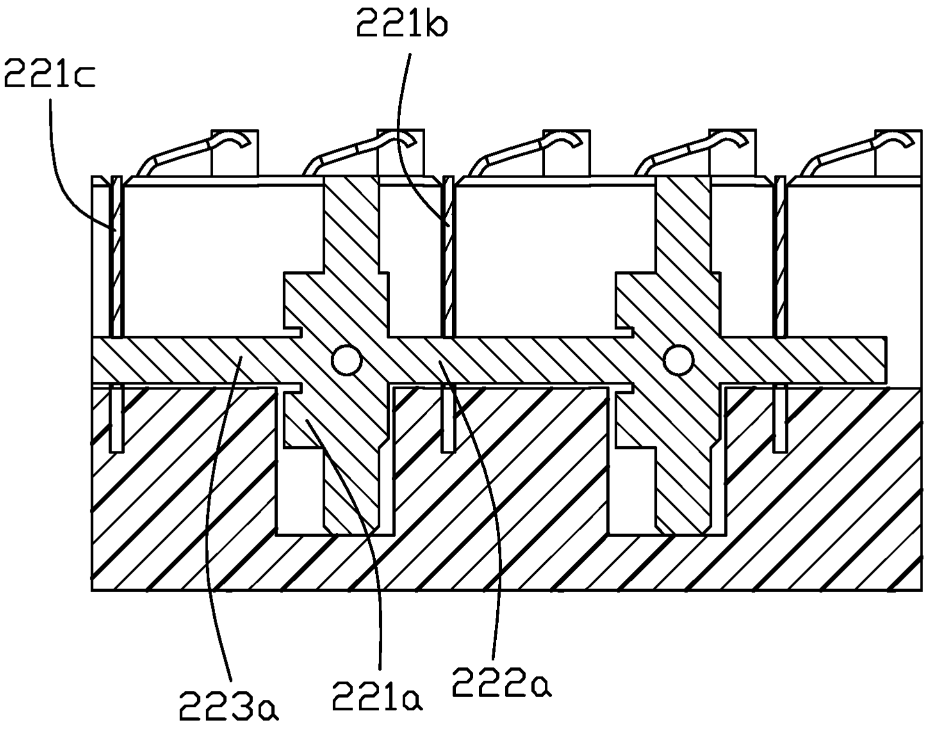
FIG. 9 is a cross-sectional view of the electrical connector taken along line A-A in FIG. 4.

Referring to FIGS. 5 and 8, each of the ground contacts 22*b* and 22*c* includes a body 221*b* or 221*c*, an upper arm 222*b* or 222*c*, and a lower arm. The upper arm 222*b* or 222*c* has a contacting convex 223 facing upward. The body 221*b* or 221*c* has a slot 2210*b* or 2210*c*. The coupling element 30 engages the slots 2210*b* and 2210*c* of the bodies 221*b* and 221*c*. In conjunction with FIG. 9, the ground contact 22*a* includes a body 221*a*, a first branch 222*a* engaging the slot 2210*b* of a corresponding ground contact 22*b* of the second row, and a second branch 223*a* engaging the slot 2210*c* of a corresponding ground contact 22*c* of the third row, the first and second branches 222*a* and 223*a* constituting the coupling element 30 or a strip of the coupling element 30. The coupling element 30 is integrally formed with the ground contact 22*a*. In this embodiment, both the ground contacts 22*b* and 22*c* have same structure and the bodies 221*b* and 221*c* thereof lie in a plane along the direction X. The body 221*a* of the ground contact 22*a* lie in a plane along the direction Y perpendicular to the direction X and the first and second branches 222*a* and 223*a* are coplanar with the body 221*a*.

Figure 2:
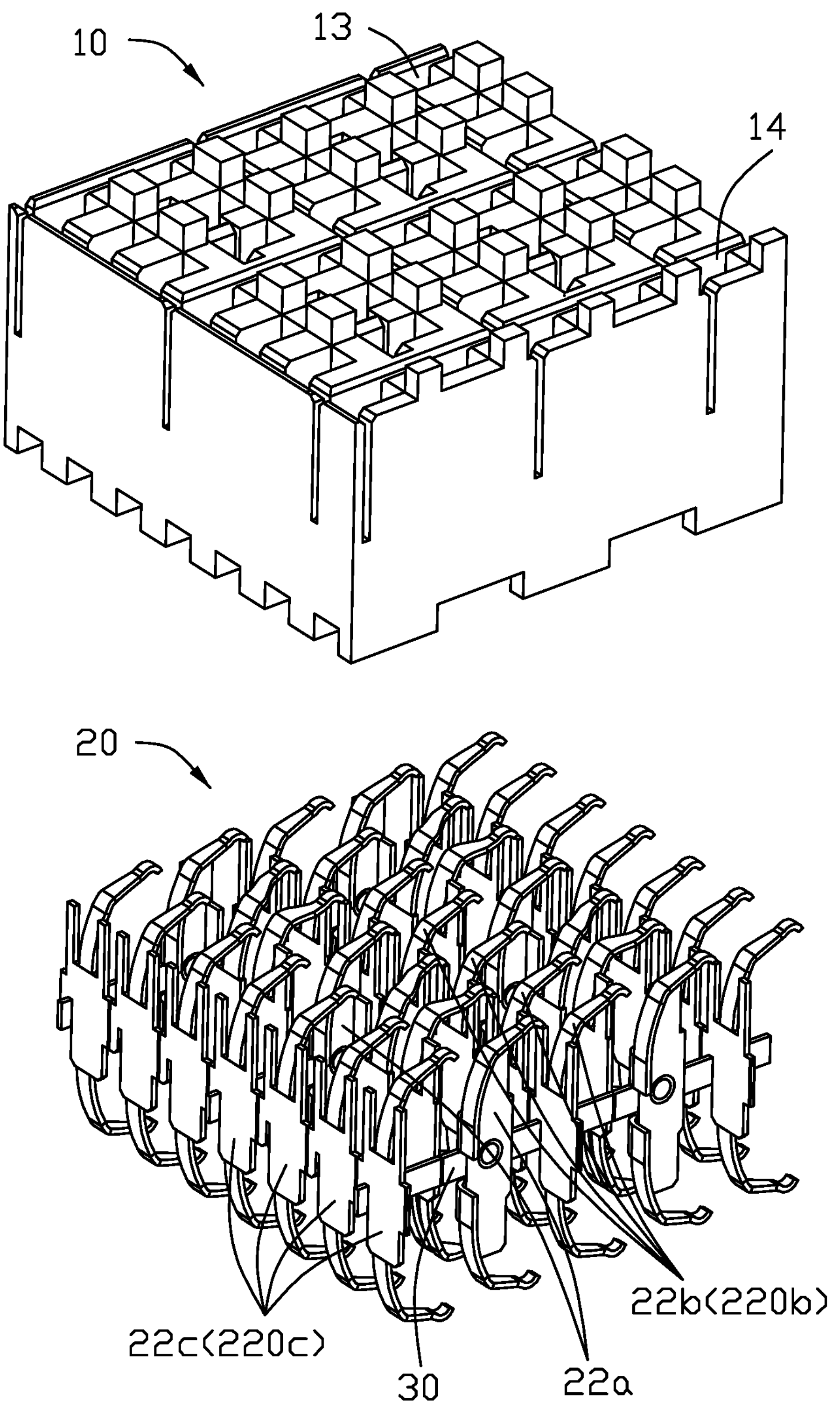
FIG. 2 is an exploded view of the electrical connector.
Figure 3:
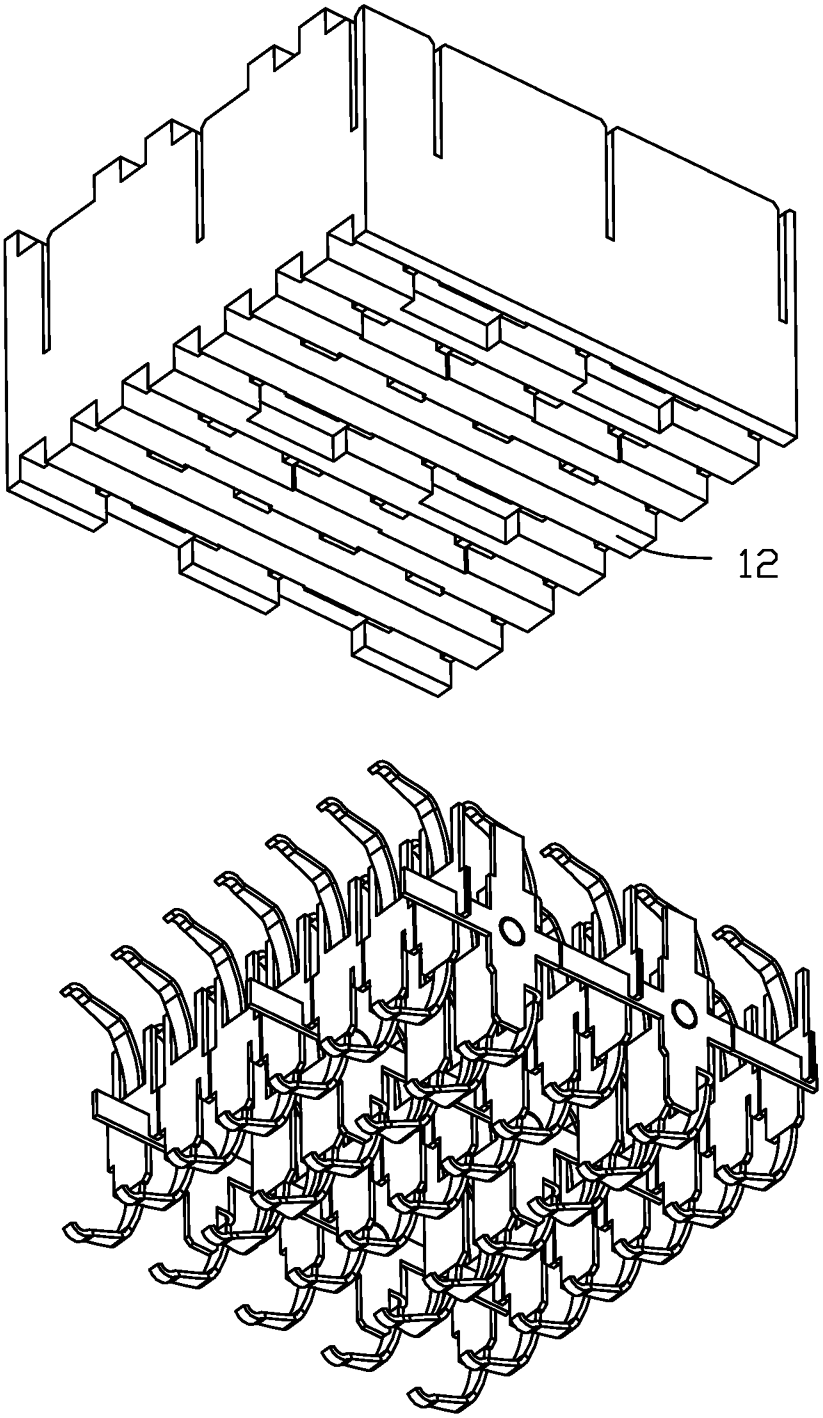
FIG. 3 is a view similar to FIG. 2 but from another perspective.

Referring to FIGS. 5-8, each signal contact 21 has a body 211, an upper arm 212, and a lower arm. The upper arm 212 has a contacting convex facing upward. The four ground contacts 22*b* of the second row abut each other side by side or are otherwise connected together and the four ground contacts 22*c* of the third row abut each other side by side or are otherwise connected together so as to form a shielding structure. Preferably, the body 221*b* or 221*c* of each of the ground contacts 22*b* and 22*c* has a main part 224 and two opposite side parts 225. The slot 2210*b* or 2210*c* is formed at a junction between the main part 224 and the side part 225 and extends through a bottom thereof. As shown in FIGS. 1 and 2, the substrate 10 has receiving channels 14 through the surface 11 to accommodate the coupling element 30. After the coupling element 30 together with the ground contact 22*a* is mounted in place, the ground contacts 22*b* and 22*c* may be mounted to engage the coupling element 30 by way of the slots 2210*b* and 2210*c*.

Each of the ground contacts 22*b* and 22*c* may have a pair of symmetrically arranged connecting portions 226 connected with a contact carrier which is then severed.

Figure 10:
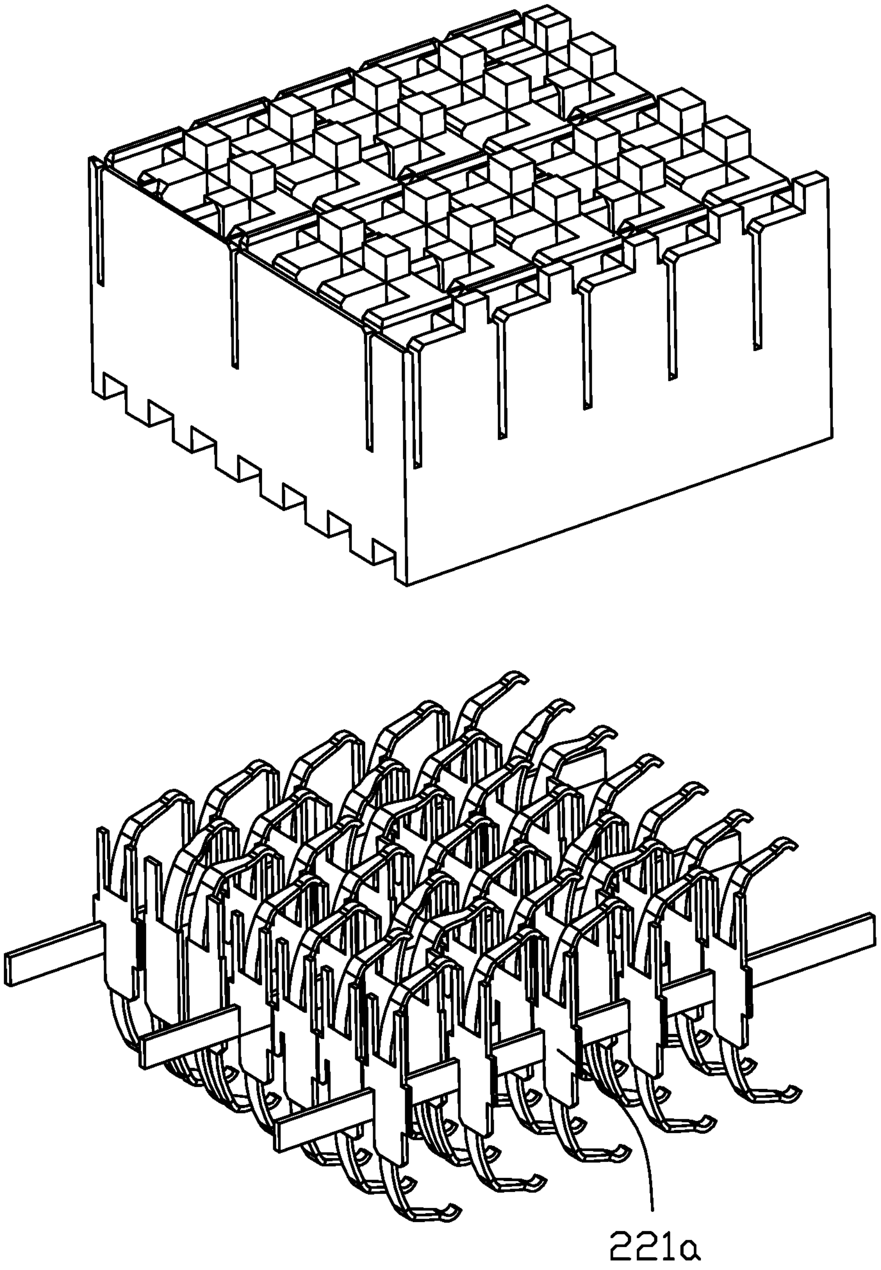
FIG. 10 is an exploded view of a varied electrical connector in accordance with the present invention.
Figure 11:
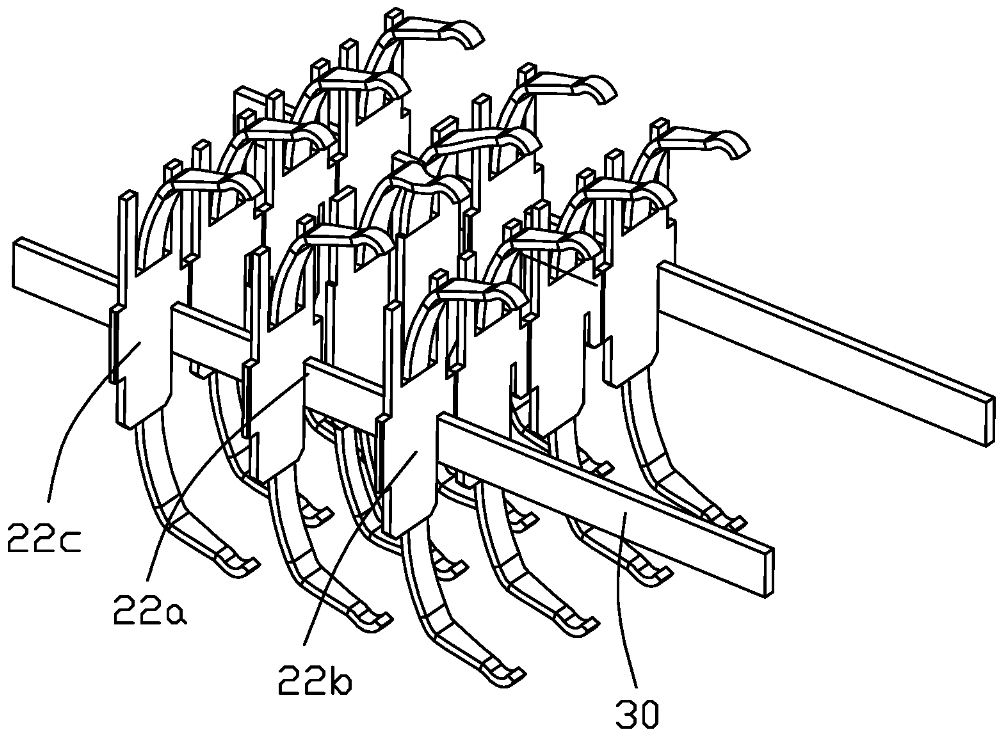
FIG. 11 is a perspective view showing three rows of contacts and a coupling element of the varied electrical connector.
Figure 12:
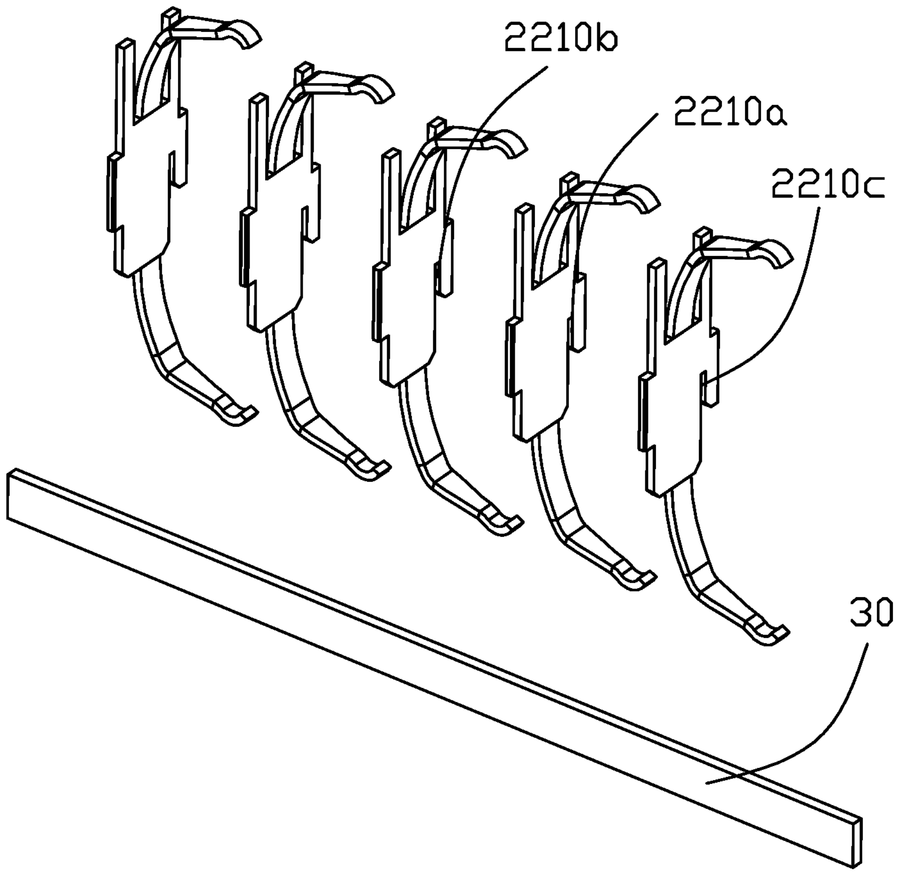
FIG. 12 is an exploded view showing selected ground contacts of the three rows of contacts in FIG. 11.

Referring to FIGS. 10-12, an electrical connector 100 in a varied design in accordance with the present invention shows the ground contact 22*a* also has a body 221*a* with a slot 2210*a* and the coupling element 30 in the form of several strips interconnects corresponding ground contacts 22*a*, 22*b*, and 22*c* by way of slots 2210*a*, 2210*b*, and 2210*c* thereof. In this varied design, the ground contacts 22*a*, 22*b*, and 22*c* may have same structure. Namely, the body of the ground contact 22*a* in the first row lies in a plane along the direction X so that all ground contacts 22*a*, 22*b*, and 22*c* are oriented in same direction.

The invention claimed is:

1. An electrical connector comprising:

a substrate having a plurality of holes;

a plurality of contacts mounted in corresponding holes of the substrate, the plurality of contacts including a first row of contacts arranged as a pair of signal contacts flanked by two ground contacts, a second row of contacts having four ground contacts on one side of the first row of contacts, and a third row of contacts having four ground contacts on another side of the first row of contacts, each of the plurality of contacts including a body and an upper arm; and a coupling element interconnecting the two ground contacts of the first row to selected ground contacts of the second and third rows; wherein the upper arm of each of the plurality of contacts has a contacting convex facing upward; and the four ground contacts of the second row are connected side by side and the four ground contacts of the third row are connected side by side;

the coupling element includes:

a first strip interconnecting one of the two ground contacts of the first row to a corresponding ground contact of the second row and a corresponding ground contact of the third row; and a second strip interconnecting the other of the two ground contacts of the first row to another corresponding ground contact of the second row and another corresponding ground contact of the third row;

the one ground contact of the first row has a first branch engaging the corresponding ground contact of the second row and a second branch engaging the corresponding ground contact of the third row, the first branch and the second branch constituting the first strip; and the other ground contact of the first row has a first branch engaging the corresponding ground contact of the second row and a second branch engaging the corresponding ground contact of the third row, the first branch and the second branch constituting the second strip.

2. The electrical connector as claimed in claim 1, wherein the body of each ground contact in the first row lies in a plane along a first direction, and the body of each ground contact in the second and third rows lies in a plane along a second direction perpendicular to the first direction.

* * * * *